(12) United States Patent
Takuno et al.

(10) Patent No.: US 12,362,679 B2
(45) Date of Patent: Jul. 15, 2025

(54) POWER CONVERSION DEVICE

(71) Applicant: Mitsubishi Electric Corporation, Tokyo (JP)

(72) Inventors: Tsuguhiro Takuno, Tokyo (JP); Ryoji Tsuruta, Tokyo (JP); Takuya Kataoka, Tokyo (JP); Takaharu Ishibashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 230 days.

(21) Appl. No.: 18/008,681

(22) PCT Filed: Aug. 5, 2020

(86) PCT No.: PCT/JP2020/029979
§ 371 (c)(1),
(2) Date: Dec. 7, 2022

(87) PCT Pub. No.: WO2022/029921
PCT Pub. Date: Feb. 10, 2022

(65) Prior Publication Data
US 2023/0223862 A1   Jul. 13, 2023

(51) Int. Cl.
*H02M 7/219*   (2006.01)
*H02M 1/00*   (2006.01)
*H02M 3/158*   (2006.01)

(52) U.S. Cl.
CPC ........... *H02M 7/219* (2013.01); *H02M 1/007* (2021.05); *H02M 3/158* (2013.01)

(58) Field of Classification Search
CPC ....... H02M 7/219; H02M 1/007; H02M 3/158
See application file for complete search history.

(56) References Cited

U.S. PATENT DOCUMENTS

| | | | | |
|---|---|---|---|---|
| 6,225,708 | B1* | 5/2001 | Furukawa | G06F 1/305 307/66 |
| 2008/0083705 | A1* | 4/2008 | Peters | B23K 9/091 219/61 |
| 2008/0094859 | A1 | 4/2008 | Takayanagi et al. | |
| 2009/0200870 | A1 | 8/2009 | Uno et al. | |
| 2011/0221281 | A1* | 9/2011 | Miyamoto | H02M 1/32 307/151 |

(Continued)

FOREIGN PATENT DOCUMENTS

| | | |
|---|---|---|
| EP | 2595291 A1 | 5/2013 |
| JP | H09-294381 A | 11/1997 |

(Continued)

OTHER PUBLICATIONS

International Search Report and Written Opinion mailed on Oct. 27, 2020, received for PCT Application PCT/JP2020/029979, filed on Aug. 5, 2020, 8 pages including English Translation.

*Primary Examiner* — Adolf D Berhane
(74) *Attorney, Agent, or Firm* — XSENSUS LLP

(57) ABSTRACT

A power conversion device includes an AC/DC conversion unit, at least one DC/DC conversion unit connected in parallel to a DC output of the AC/DC conversion unit, and a control unit for controlling the AC/DC conversion unit and the DC/DC conversion unit, wherein at least one of two or more DC outputs is the DC output of the AC/DC conversion unit and the DC/DC conversion unit includes two chopper legs.

18 Claims, 11 Drawing Sheets

(56) References Cited

U.S. PATENT DOCUMENTS

| | | | |
|---|---|---|---|
| 2013/0301323 A1* | 11/2013 | Iyasu | H02M 1/4233 |
| | | | 363/123 |
| 2022/0014018 A1* | 1/2022 | Higaki | H02J 9/061 |
| 2022/0181869 A1* | 6/2022 | Jimichi | H02M 7/219 |
| 2022/0255419 A1* | 8/2022 | Tsuruta | H02M 7/219 |

FOREIGN PATENT DOCUMENTS

| | | |
|---|---|---|
| JP | 2000-014043 A | 1/2000 |
| JP | 2006-230057 A | 8/2006 |
| JP | 2008-109754 A | 5/2008 |
| JP | 2010-028942 A | 2/2010 |
| JP | 2011-030329 A | 2/2011 |
| JP | 2013-106519 A | 5/2013 |
| JP | 2020-108249 A | 7/2020 |
| WO | WO-2021038823 A1 * 3/2021 | ......... H02M 1/0009 |

* cited by examiner

POWER CONVERSION DEVICE

CROSS-REFERENCE TO RELATED APPLICATION

The present application is based on PCT filing PCT/JP2020/029979, filed Aug. 5, 2020, the entire contents of which are incorporated herein by reference.

TECHNICAL FIELD

The present disclosure relates to a power conversion device.

BACKGROUND ART

Various power conversion devices for converting AC power to DC power have been proposed. Examples include a circuit in which a full-bridge converter is formed using semiconductor switching elements and DC power is directly obtained from AC power, a circuit in which a chopper and a rectification circuit composed of diodes are combined, and the like.

A power conversion device having a plurality of output terminals for supplying voltage adapted to each type of load in a case where required voltage is different among types of loads, is disclosed (see, for example, Patent Document 1).

CITATION LIST

Patent Document

Patent Document 1: Japanese Laid-Open Patent Publication No. 2011-30329

SUMMARY OF THE INVENTION

Problems to be Solved by the Invention

The device in Patent Document 1 is provided with power conversion circuits for the respective output terminals, in order to obtain a plurality of output voltages. Thus, there is a problem that the size of the power conversion device increases and loss increases due to increase in the number of conversion stages.

The present disclosure has been made to solve the above problem, and an object of the present disclosure is to decrease the number of power conversion circuits connected to DC output, terminals, reduce the size of the device, and reduce loss.

Solution to the Problems

A power conversion device according to the present disclosure includes an AC/DC conversion unit and at least one DC/DC conversion unit connected in parallel to a DC output of the AC/DC conversion unit, wherein at least one of two or more DC outputs is the DC output of the AC/DC conversion unit, and the DC/DC conversion unit includes two chopper legs connected in parallel, the chopper legs each being formed by connecting a plurality of semiconductor switching elements in series.

Effect of the Invention

The power conversion device according to the present disclosure makes it possible to decrease the number of power conversion units, reduce the size of the device, and reduce loss.

DESCRIPTION OF EMBODIMENTS

Embodiment 1

Figure 1:
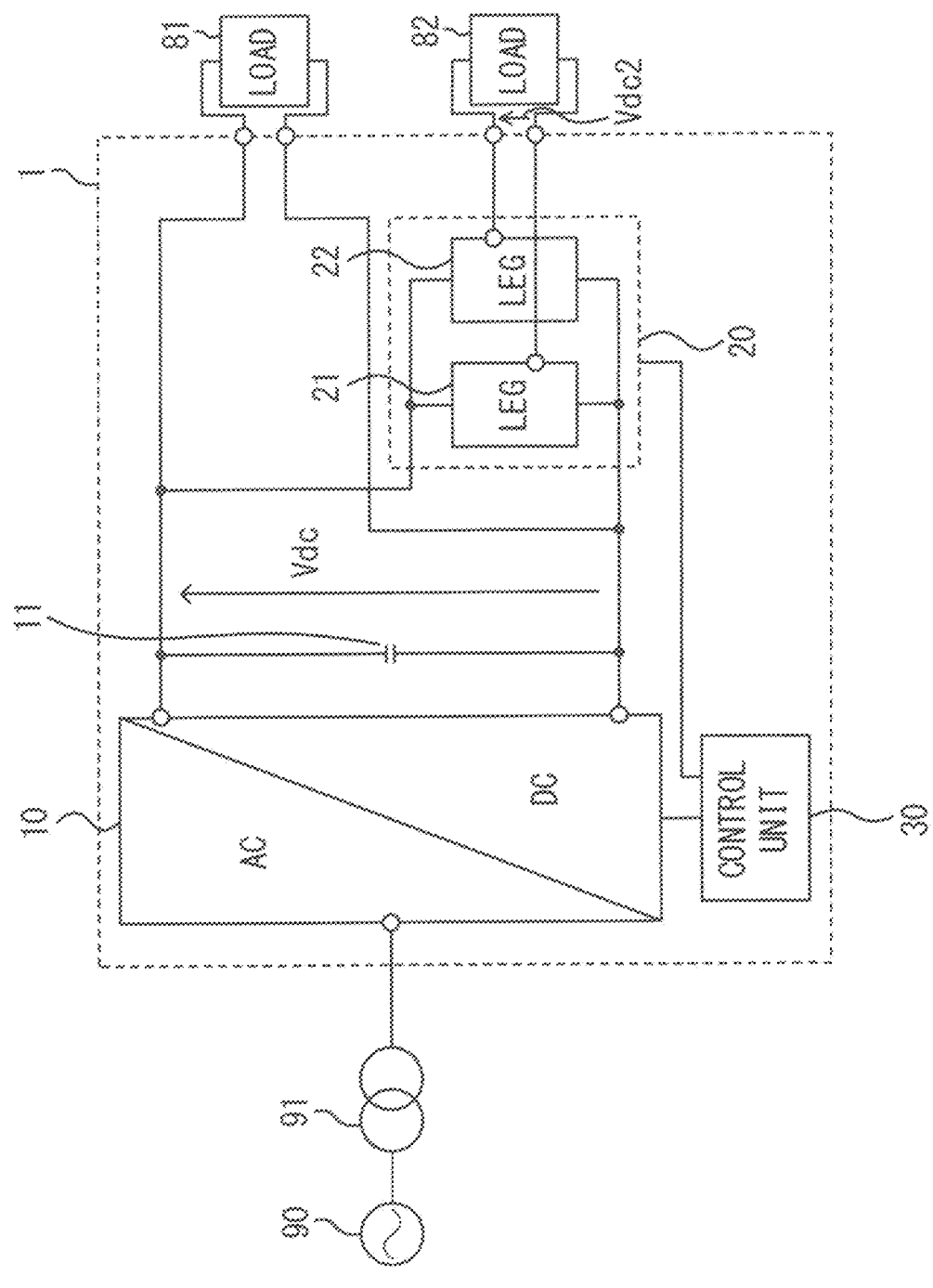
FIG. 1 is a configuration diagram of a power conversion device according to embodiment 1.

Embodiment 1 relates to a power conversion device including an AC/DC conversion unit, at least one DC/DC conversion unit connected in parallel to a DC output of the AC/DC conversion unit, and a control unit for controlling the AC/DC conversion unit and the DC/DC coversion unit, wherein at least one of two or more DC outputs is the DC output of the AC/DC conversion unit, and the DC/DC conversion unit includes two chopper legs.

Hereinafter, the configuration and operation of the power conversion device according to embodiment 1 will be described with reference to FIG. 1 that is a configuration diagram of the power conversion device, FIG. 2 that is a flowchart of the control unit, FIG. 3 and FIG. 4 that show configuration examples of the AC/DC conversion unit, and FIG. 5 that shows a configuration example of the DC/DC conversion unit.

The entire configuration of the power conversion device 1 of embodiment 1 will be described with reference to FIG. 1.

The entire power conversion device system includes the power conversion device 1 as a main component, and includes an AC power supply 90 and a power reception transformer 91 on the AC input side, and a first load 81 and a second load 82 on the DC output side.

The power conversion device 1 is connected to the AC power supply 90 via the power reception transformer 91.

The AC power supply 90, the power reception transformer 91, the first load 81, and the second load 82 are not parts of the power conversion device 1, but they are closely related thereto and therefore are described without being separated from the power conversion device 1.

The configuration of the power conversion device 1 will be described.

Main components of the power conversion device 1 are an AC/DC conversion unit 10, a DC/DC conversion unit 20, and a control unit 30.

The AC/DC conversion unit 10 and the DC/DC conversion unit 20 are controlled by the control unit 30. The AC/DC conversion unit 10 performs power conversion from AC to DC. A DC output of the AC/DC conversion unit 10 is formed of two terminals, that is, a DC positive terminal and a DC negative terminal.

On the DC output side of the AC/DC conversion unit 10, a DC link capacitor 11 is connected between the DC positive terminal and the DC negative terminal, in order to stabilize DC voltage.

In the following description, the DC output side of the AC/DC conversion unit 10 is referred to as DC link. In addition, the DC link capacitor 11 is referred to as capacitor 11.

The DC/DC conversion unit 20 is connected to the DC link.

The power conversion device 1 of embodiment 1 includes a plurality of DC outputs.

Figure 2:
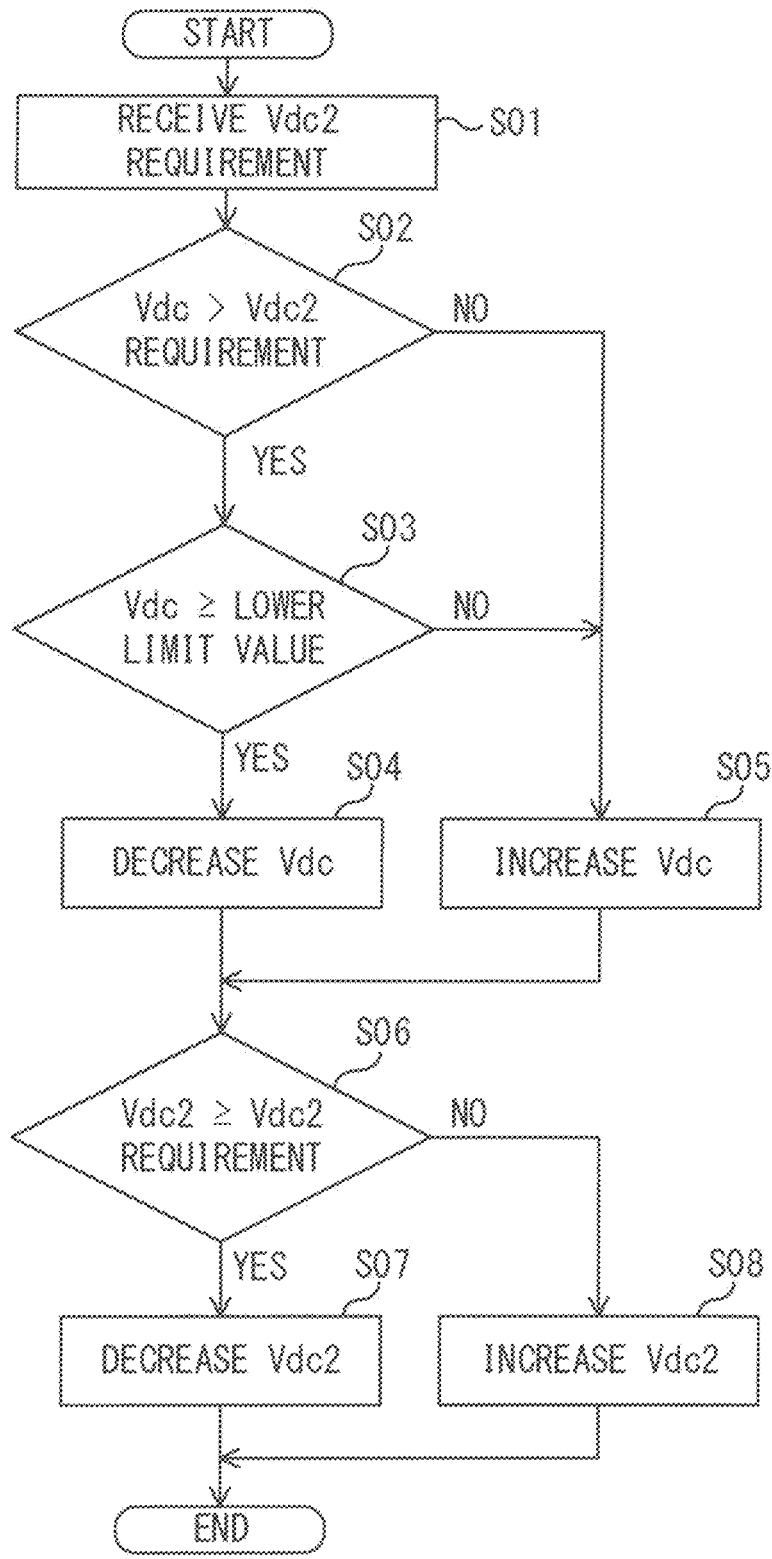
FIG. 2 is a flowchart of a control unit in the power conversion device according to embodiment 1.

In FIG. 1, the first load 81 is connected to the DC output side of the AC/DC conversion unit 10, that is, the DC link. The second load 82 is connected to the output side of the DC/DC conversion unit 20.

A plurality of loads may be connected to one DC output. In order to supply output voltages matched with the loads, the respective DC outputs can output different voltages.

In FIG. 1, the "first load" and the "second load" are described as "load".

The DC/DC conversion unit 20 converts DC link voltage to DC output voltage matched with the requirement of the load.

The DC/DC conversion unit 20 is a chopper circuit in which at least two chopper legs each formed by connecting a plurality of semiconductor switching elements in series are connected in parallel.

FIG. 1 shows a case of having two chopper legs 21, 22. In FIG. 1, the "chopper leg" is described as "leg".

In FIG. 1, for facilitating understanding of the basic configuration, only one DC/DC conversion unit 20 is shown, but in actuality, a plurality of DC/DC conversion units 20 are connected in accordance with the number of loads.

Normally, a reactor and a capacitor for smoothing current and voltage are connected to the chopper circuit.

In general, the AC/DC conversion unit 10 is controlled so that the DC link voltage becomes constant. A lower limit value of the DC link voltage is determined in accordance with inputted AC voltage. As the DC link voltage, voltage close to the lower limit value is selected. For generating each DC output voltage from the DC link voltage, the DC/DC conversion unit 20 is connected to the DC link.

However, if the DC/DC conversion units 20 are connected correspondingly to the respective DC outputs, the same numbers of conversion circuits, reactors, and capacitors as the number of DC outputs are needed.

As power to be converted in the DC/DC conversion unit 20 increases, the sizes of the reactor and the capacitor significantly increase, thus occupying a large volume as compared to the other components in the DC/DC conversion unit 20. As a result, the size of the power conversion device 1 increases. In addition, in the DC/DC conversion unit 20, loss occurs due to power conversion, so that efficiency of the entire power conversion device is deteriorated.

In order to solve the above problem, in embodiment 1, the DC link is directly used as one of the DC outputs. The configuration is made such that the DC link voltage generally designed to be kept at constant voltage can be changed within a certain range by the control unit 30, whereby voltage in accordance with the load is supplied not via the DC/DC conversion unit 20.

For example, in a case of an AC/DC converter that receives three-phase AC and outputs DC, where AC line-to-line voltage is denoted by Vac and the DC link voltage is denoted by Vdc, the lower limit value of the DC link voltage is determined by the following Expression (1).

$$Vdc \geq ((2\sqrt{2})/\sqrt{3})\alpha Vac \quad (1)$$

Here, α is a coefficient not less than 1, set in consideration of a variation rate of AC voltage, control allowance of the AC/DC conversion unit 10, a margin, and the like.

Normally, DC output voltage control of the AC/DC conversion unit 10 is performed so that the DC link voltage becomes voltage close to the lower limit value. If the DC link voltage becomes lower than the lower limit value in a case of α=1 in Expression (1), the AC/DC conversion unit 10 can no longer perform normal power conversion operation. Therefore, the DC link voltage is controlled to be not less than the lower limit value of Expression (1).

The control unit 30 controls the AC/DC conversion unit 10 in accordance with required voltage (Vdc1 requirement) of the first load 81 connected to the AC/DC conversion unit 10. In addition, the control unit 30 controls the DC/DC conversion unit 20 in accordance with required voltage (Vdc2 requirement) of the second load 82 connected to the output of the DC/DC conversion unit 20.

At this time, in accordance with the lower limit value of the DC link voltage (vdc) determined from AC voltage, control is performed so that the DC link voltage (Vdc) does not become lower than the lower limit value.

In addition, for example, if required voltage (Vdc2 requirement) of the second load 82 is smaller than the DC link voltage (Vdc), the DC/DC conversion unit 20 having a circuit configuration capable of stepping down voltage is connected to the DC link and thus steps down voltage.

Conversely, if required voltage (Vdc2 requirement) of the second load 82 is equal to or greater than the DC link voltage (Vdc), the DC/DC conversion unit 20 boosts voltage. Thus, power can be supplied at voltage matched with the requirement of the second load 82.

Here, if voltage (Vdc1 requirement) required by the first load 81 is smaller than the lower limit value of Expression (1), the AC/DC conversion unit 10 cannot be controlled to the required voltage, and therefore it is necessary to output voltage stepped down via the DC/DC conversion unit 20.

On the other hand, if voltage (Vdc1 requirement) required by the first load 81 is equal to or greater than the lower limit value of Expression (1), the AC/DC conversion unit 1 is controlled to match the DC link voltage with voltage (Vdc1 requirement) required by the first load 81, whereby the DC link voltage (Vdc) can be directly used as DC output voltage not via the DC/DC conversion unit 20.

In general, the specifications of the first load 81 and the number and the specifications of the second loads 82 are determined before the power conversion device 1 is operated. Therefore, the variation range of the DC link voltage of the AC/DC conversion unit 10, the number and the variation range of output voltages of the DC/DC conversion units 20, and the circuit configurations are determined in advance before connection to the loads.

Here, means for the first load 81 and the second load 82 to transfer the required voltages (Vdc1 requirement, Vdc2 requirement) to the control unit 30 will be described.

The first load 81 and the second load 82 may directly transfer required voltages by communicating with the control unit 30. Alternatively, for example, required voltages calculated by an external calculation device (not shown) such as an energy management system may be transferred to the control unit 30 through communication.

Still alternatively, from voltages and currents at circuit parts measured by voltage measurement means and current measurement means (not shown), the control unit 30 may estimate the operation states of the loads and thus may calculate the required voltages. These are merely examples, and the power conversion device 1 of embodiment 1 can be implemented also by another example.

An example of control operation of the control unit 30 for the second load 82 connected to the DC/DC conversion unit 20 of a step-down type will be described with reference to the flowchart in FIG. 2.

The control unit 30 executes a process from step 1 (S01) to step 8 (S08) of the flowchart, in every control cycle.

First, in step 1 (S01), the control unit 30 receives required voltage (Vdc2 requirement) of the second load 82.

In step 2 (S02), whether or not the DC link voltage (Vdc) is greater than the required voltage (Vdc2 requirement) of the second load 82 is determined. In a case of YES, that is, if the DC link voltage (Vdc) is greater than the required voltage (Vdc2 requirement) of the second load 82, the process proceeds to step 3 (S03). In a case of NO, the process proceeds to step 5 (S05).

In step 3 (S03), whether or not the DC link voltage (Vdc) is equal to or greater than the lower limit value of the DC link voltage is determined. In a case of YES, that is, if the DC link voltage (Vdc) is equal to or greater than the lower limit value of the DC link voltage, the process proceeds to step 4 (S04). In a case of NO, the process proceeds to step 5 (S05).

In step 4 (S04), the AC/DC conversion unit 10 is controlled so that the DC link voltage (Vdc) is decreased to voltage close to the lower limit value of the DC link voltage, and then the process proceeds to step 6 (S06).

In step 5 (S05), the AC/DC conversion unit 10 is controlled so that the DC link voltage (Vdc) is increased to the lower limit value of the DC link voltage or greater, and then the process proceeds to step 6 (S06).

In step 6 (S06), whether or not the output voltage (Vdc2) of the DC/DC conversion unit 20 is equal to or greater than the required voltage (Vdc2 requirement) of the second load 82 is determined. In a case of YES, that is, if the output voltage (Vdc2) of the DC/DC conversion unit 20 is equal to or greater than the required voltage (Vdc2 requirement) of the second load 82, the process proceeds to step 7 (S07). In a case of N, the process proceeds to step 8 (S08).

In step 7 (S07), the DC/DC conversion unit 20 is controlled so that the output voltage (vdc2) of the DC/DC conversion unit 20 is decreased and thus follows the required voltage (Vdc2 requirement) of the second load 82.

In step 8 (S08), the DC/DC conversion unit 20 is controlled so that the output voltage (Vdc2) of the DC/DC conversion unit 20 is increased and thus follows the required voltage (Vdc2 requirement) of the second load 82.

Thus, the case where one load is connected to each of the AC/DC conversion unit 10 and the DC/DC conversion unit has been described. Here, a case where a plurality of loads are connected will be described.

In a case of connecting three or more loads, DC/DC conversion units 20 are connected to the DC link, for the increased loads, whereby voltages matched with the respective loads are supplied.

In this configuration, for example, in a case of supplying a plurality of voltages to the loads, connection is made such that the AC/DC conversion unit 10 directly outputs voltage to the load that requires highest voltage. For the other loads, voltage is stepped down to appropriate voltages and the stepped-down voltages are supplied, via the DC/DC conversion units 20 of a step-down type. In this case, all the DC/DC conversion units 20 can be uniformed to a step-down type, whereby the basic configurations of the DC/DC conversion units can be uniformed.

Connection is made such that the AC/DC conversion unit 10 directly outputs voltage to the load whose power consumption is the greatest. For the other loads, the DC/DC conversion units 20 may be configured to be a step-down type or a boost type in accordance with the magnitude relationship of the DC link voltage of the AC/DC conversion unit 10 and the required voltages of the loads, thereby converting voltage to appropriate voltages and supplying the converted voltages.

For a converter that converts larger power, the sizes of the reactor and the capacitor increase. Therefore, if the DC/DC conversion unit 20 is not needed for the load to which largest power is outputted, the size reduction effect of the power conversion device 1 is maximized.

Further, even if conversion efficiencies of the DC/DC conversion units 20 are the same, lose increases as power to be converted increases. Therefore, if the number of conversion circuits to be passed is decreased for the load that requires largest power, the conversion loss reduction effect becomes great.

In embodiment 1, the DC/DC conversion units 20 can be decreased, and large components such as a reactor and a capacitor can be decreased. As a result, the size of the power conversion device 1 can be reduced. In addition, in the power conversion device 1 of embodiment 1, the number of the power conversion units to be passed between the AC input and the DC output can be decreased by one. Thus, loss of the power conversion device 1 is reduced and conversion efficiency can be improved.

Here, a configuration example of the AC/DC conversion unit 10 and a configuration example of the DC/DC conversion unit 20 will be described.

Figure 3:
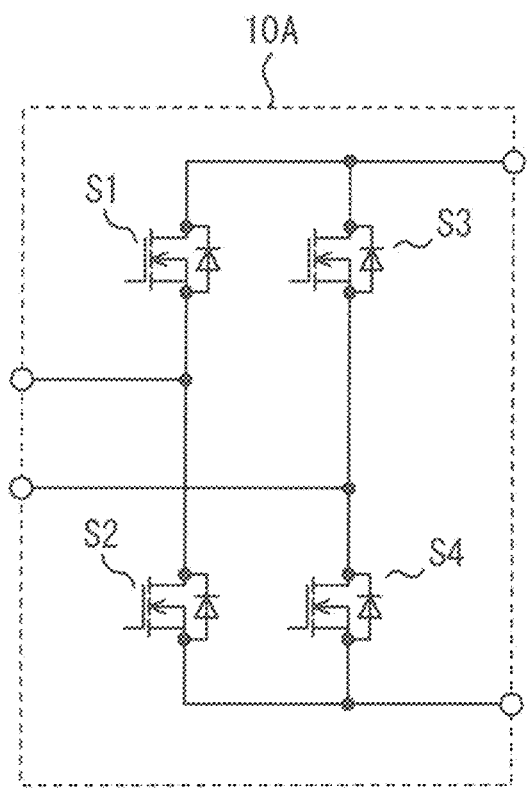
FIG. 3 shows a configuration example of an AC/DC conversion unit in the power conversion device according to embodiment 1.

FIG. 3 shows a configuration example in a case where the AC input has a single phase, and an AC/DC conversion unit 10A includes semiconductor switching elements S1, S2, S3, S4. FIG. 4 shows a configuration example in a case where the AC input has three phases, and an AC/DC conversion unit 10B includes semiconductor switching elements S5, 56, S7, S8, S9, S10.

Figure 5:
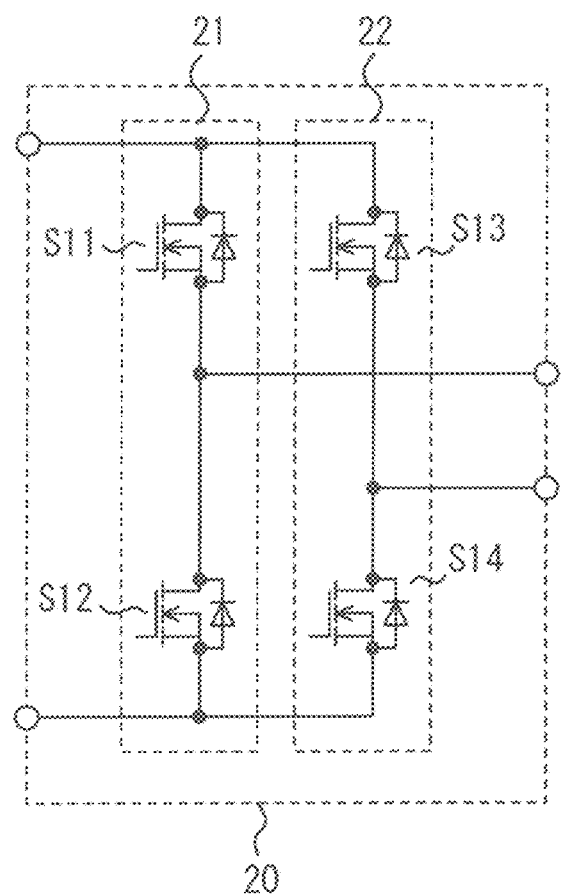
FIG. 5 shows a configuration example of a DC/DC conversion unit in the power conversion device according to embodiment 1.

FIG. 5 shows a configuration example of the DC/DC conversion unit 20. This is an example of a step-down circuit. The chopper leg 21 includes semiconductor switching elements S11, S12, and the chopper leg 22 includes semiconductor switching elements S13, S14.

Figure 4:
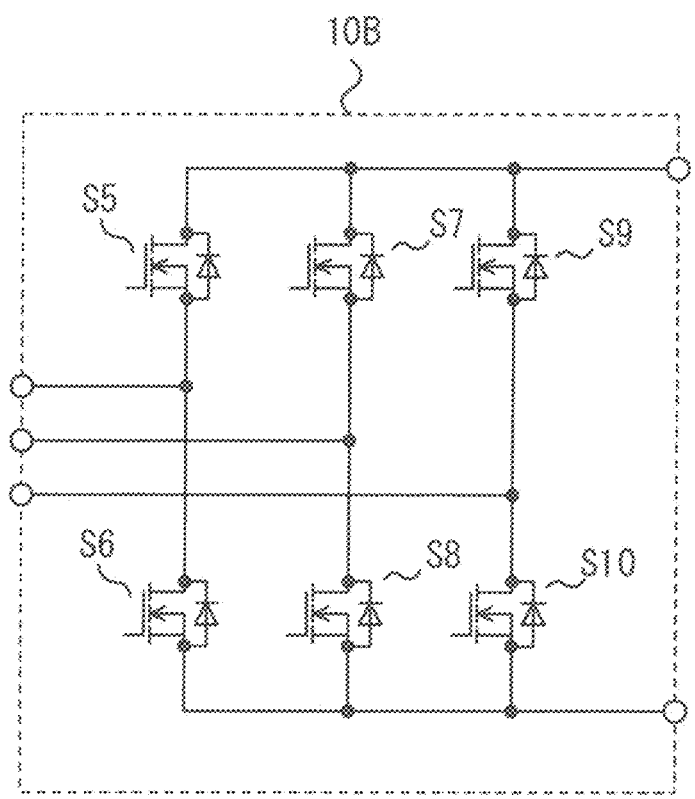
FIG. 4 shows a configuration example of an AC/DC conversion unit in the power conversion device according to embodiment 1.

In FIG. 3 to FIG. 5, it is assumed that metal-oxide-semiconductor field-effect transistors (MOSFET) are used as the semiconductor switching elements. The semiconductor switching elements may be other self-turn-off semiconductor switching elements, e.g., insulated gate bipolar transistors (IGBT).

In the above description of the configuration and the function in embodiment 1, the case where the AC input has three phases is assumed. However, the same effects are provided also in a case where the AC input has a single phase.

As described above, the power conversion device of embodiment 1 includes an AC/DC conversion unit, at least one DC/DC conversion unit connected in parallel to a DC output of the AC/DC conversion unit, and a control unit for controlling the AC/DC conversion unit and the DC/DC conversion unit, wherein at least one of two or more DC outputs is the DC output of the AC/DC conversion unit, and the DC/DC conversion unit includes two chopper legs.

Thus, the power conversion device of embodiment 1 makes it possible to decrease the number of power conversion units, reduce the size of the device, and reduce loss.

Embodiment 2

In a power conversion device of embodiment 2, voltage of the output of the AC/DC conversion unit is divided by resistors, filters each composed of a reactor and a capacitor are connected to the output of the DC/DC conversion unit, and the voltage division point between the resistors and a connection point between one end and one end of the capacitors are connected to each other.

The power conversion device of embodiment 2 will be described, focusing on difference from embodiment 1, with reference to FIG. 6 that is a configuration diagram of the power conversion device.

Figure 6:
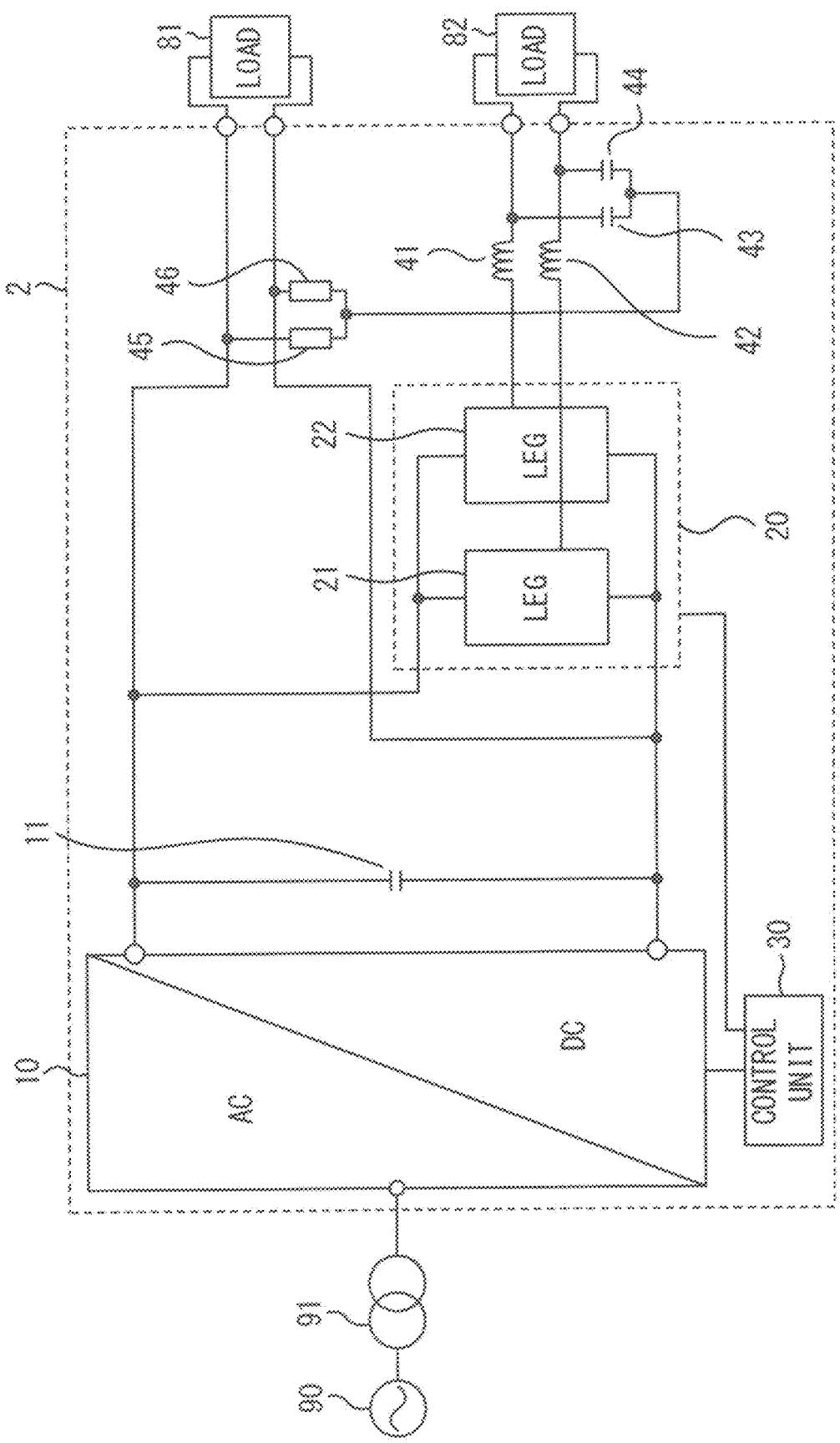
FIG. 6 is a configuration diagram of a power conversion device according to embodiment 2.

In FIG. 6 of embodiment 2, the same or corresponding parts as those in embodiment 1 are denoted by the same reference characters.

For discrimination from embodiment 1, the power conversion device is denoted by 2.

In the power conversion device 2 of embodiment 2, components added to the power conversion device 1 of embodiment 1 will be described with reference to FIG. 6.

One end of a resistor 45 is connected to the positive terminal of the DC output directly outputted from the DC link of the AC/DC conversion unit 10, and one end of the resistor 46 is connected to the negative terminal. The other ends of the resistor 45 and the resistor 46 are connected to each other.

A DC filter reactor 41 is connected in series between the positive output of the DC/DC conversion unit 20 and the DC output terminal, and a DC filter reactor 42 is connected in series between the negative output and the DC output terminal.

One end of a DC filter capacitor 43 and one end of a DC filter capacitor 44 are connected to the DC output terminal sides of the respective DC filter reactors 41, 42. The other ends of the DC filter capacitors 43, 44 are connected to each other.

Further, the connection point between the other ends of the DC filter capacitors 43, 44 and the connection point between the resistors 45, 46 are connected to each other.

The connection point between the resistors 45, 46 is a neutral point of the DC output of the AC/DC conversion unit 10, the connection point between the DC filter capacitors 43, 44 is a neutral point of the DC output of the DC/DC conversion unit 20, and these points correspond to reference potentials of the respective DC output voltages.

In the DC/DC conversion unit 20, due to switching of the chopper legs 21, 22, the reference potential of the DC output varies. Thus, the reference potentials of the DC outputs of the AC/DC conversion unit 10 and the DC/DC conversion unit 20 become different potentials.

In the power conversion device 2 of embodiment 2, the connection point between the resistors 45, 46 and the connection point between the DC filter capacitors 43, 44 are connected to each other, whereby the reference potentials of different DC outputs can be made equal to each other.

For human body protection in a case of electric leakage, a housing of a device is often connected to the reference potential. This is because there is a possibility that housings of a plurality of devices supplied with power from different outputs are touched at the same time.

In the power conversion device 2 of embodiment 2, the reference potentials of different DC outputs can be made equal to each other.

As described above, in the power conversion device of embodiment 2, the voltage of the output of the AC/DC conversion unit is divided by resistors, filters each composed of a reactor and a capacitor are connected to the output of the DC/DC conversion unit, and the voltage division point between the resistors and the connection point between one end and one end of the capacitors are connected to each other.

Thus, the power conversion device of embodiment 2 makes it possible to decrease the number of power conversion units, reduce the size of the device, and reduce loss. Further, in the power conversion device of embodiment 2, the reference potentials of the DC outputs of the AC/DC conversion unit and the DC/DC conversion unit can be made equal to each other.

Embodiment 3

In a power conversion device of embodiment 3, filters each composed of a reactor and a capacitor are connected to the AC side of the AC/DC conversion unit, the capacitors are connected in Y connection, and the neutral point among the capacitors is connected to the DC output side of the AC/DC conversion unit.

The power conversion device of embodiment 3 will be described, focusing on difference from embodiments 1 and 2, with reference to FIG. 7 that is a configuration diagram of the power conversion device.

Figure 7:
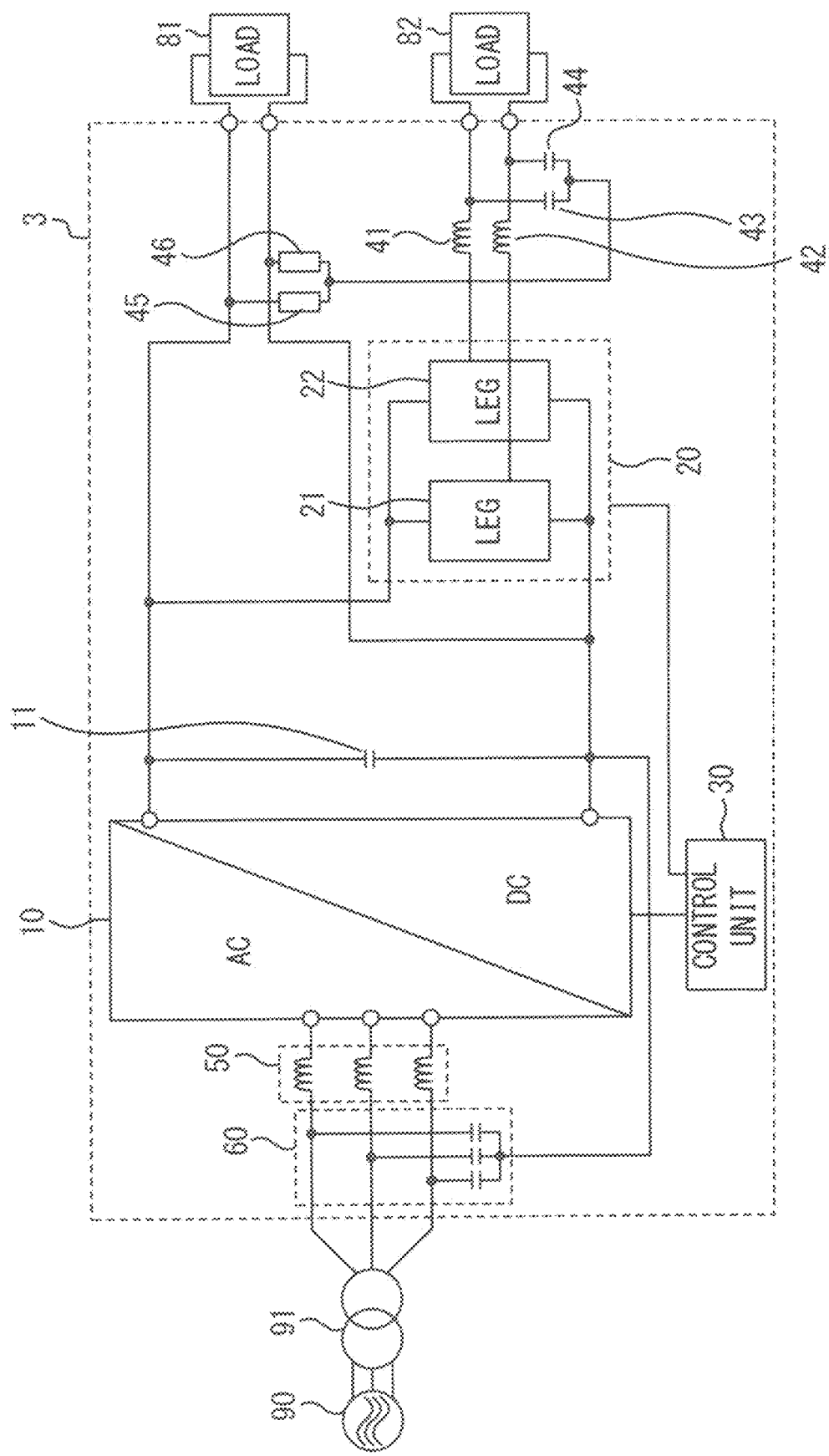
FIG. 7 is a configuration diagram of a power conversion device according to embodiment 3.

In FIG. 7 of embodiment 3, the same or corresponding parts as those in embodiments 1 and 2 are denoted by the same reference characters.

For discrimination from embodiments 1 and 2, the power conversion device is denoted by 3.

In the power conversion device 3 of embodiment 3, components added to the power conversion device 2 of embodiment 2 will be described with reference to FIG. 7.

An AC filter reactor 50 is connected in series for each phase on the AC side of the AC/DC conversion unit 10. One end of an AC filter capacitor 60 is connected for each phase on the AC power supply side of the AC filter reactor 50, and the other ends of the AC filter capacitors 60 are connected to each other.

Further, the connection point (hereinafter, referred to as AC neutral point) among the AC filter capacitors 60, and the low-voltage side of the DC link of the AC/DC conversion unit 10, are connected to each other.

When the AC/DC conversion unit 10 performs switching, harmonic current occurs. If the harmonic current leaks from the AC side to a power grid, another device connected to the power grid is adversely influenced.

Therefore, in general, an AC filter for attenuating harmonic current leaking to the power grid side needs to be provided on the AC side of the AC/DC conversion unit.

In the power conversion device 3 of embodiment 3, AC filters are formed by the AC filter reactors 50 and the AC filter capacitors 60. The cut-off frequency of the AC filters is set to a value sufficiently higher than the power supply frequency and sufficiently lower than the frequency of harmonic current, whereby harmonic current leaking to the power grid can be suppressed.

The AC/DC conversion unit 10 generates common-mode voltage through switching. The common-mode voltage is applied to a stray capacitance arising between a board, wiring, various parts, and the like, so that common-mode current occurs. There is a possibility that the common-mode current adversely influences devices as noise.

In FIG. 7, for example, such an influence that the voltage at the AC neutral point varies due to the common-mode voltage, occurs. By connecting the connection point among the AC filter capacitors 60 and the negative side of the DC link of the AC/DC conversion unit 10 to each other, the potential at the AC neutral point is stabilized, so that occurrence of common-mode current can be suppressed.

In addition, a loop for returning to the DC link from the AC side of the AC/DC conversion unit 10 is formed through wiring passing through the AC filter capacitors 60 from the AC side of the AC/DC conversion unit 10 and then connecting the AC neutral point and the DC link negative side of the AC/DC conversion unit 10. Thus, the common-mode current at the AC neutral point can be inhibited from leaking to outside of the power conversion device.

In the power conversion device 3 of embodiment 3, the case of adding the AC filters each composed of the AC filter reactor 50 and the AC filter capacitor 60 to the power conversion device 2 of embodiment 2, has been described. The same effects can be provided also in a case of adding the AC filters each composed of the AC filter reactor 50 and the AC filter capacitor 60 to the power conversion device 1 of embodiment 1.

As described above, in the power conversion device of embodiment 3, filters each composed of a reactor and a capacitor are connected to the AC side of the AC/DC conversion unit, the capacitors are connected in Y connection, and a neutral point among the capacitors is connected to the DC output side of the AC/DC conversion unit.

Thus, the power conversion device of embodiment 3 makes it possible to decrease the number of power conversion units, reduce the size of the device, and reduce loss. Further, in the power conversion device of embodiment 3, the potential at the AC neutral point is stabilized and occurrence of common-mode current can be suppressed.

Embodiment 4

In a power conversion device of embodiment 4, a voltage division point between resistors connected to the output of the AC/DC conversion unit is grounded, and a connection point between capacitors of filters connected to the output of the DC/DC conversion unit is connected to the DC output side of the AC/DC conversion unit.

The power conversion device of embodiment 4 will be described, focusing on difference from embodiment 3, with reference to FIG. 8 that is a configuration diagram of the power conversion device.

In the configuration diagram in embodiment 4, the same or corresponding parts as those in embodiment 3 are denoted by the same reference characters.

For discrimination from embodiment 3, the power conversion device is denoted by 4.

In the power conversion device 3 of embodiment 3, the neutral point voltage on the AC side is stabilized, so that common-mode noise can be suppressed. In embodiment 4, similarly, the neutral point voltage on the DC side is stabilized, so that common-mode noise on the DC side is suppressed.

In the power conversion device 4 of embodiment 4, components added to the power conversion device 3 of embodiment 3 will be described with reference to FIG. 8.

The connection point between the resistors 45, 46 connected to the DC link of the AC/DC conversion unit 10 is grounded, and the connection point between the DC filter capacitors 43, 44 is connected to the negative side of the DC link of the AC/DC conversion unit 10.

As in the case of switching of the AC/DC conversion unit 10, common-mode voltage occurs also in switching of the DC/DC conversion unit 20.

Figure 8:
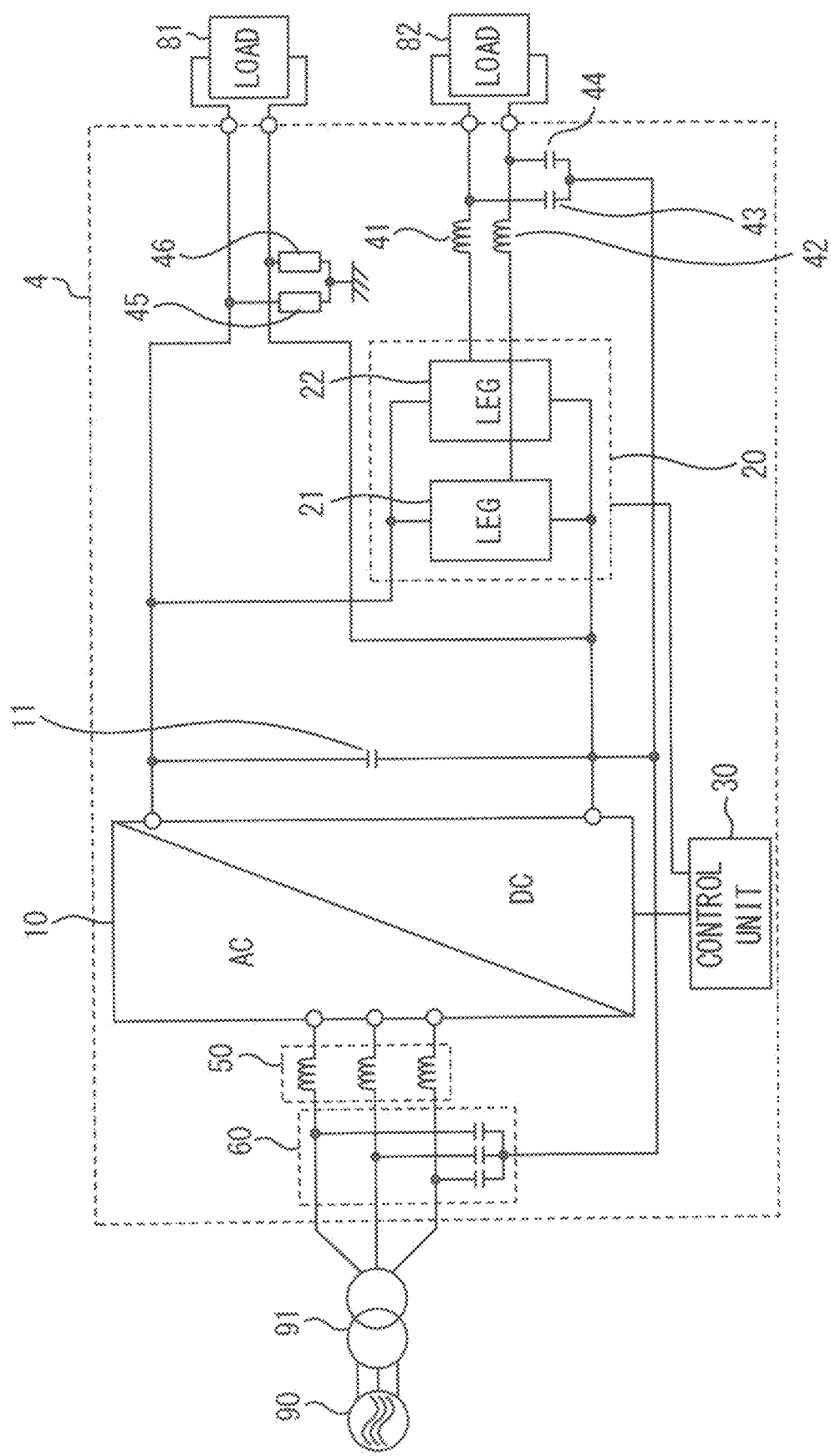
FIG. 8 is a configuration diagram of a power conversion device according to embodiment 4.

In FIG. 8, voltage at the connection point (hereinafter, referred to as DC neutral point) between the DC filter capacitors 43, 44 varies due to the common-mode voltage.

By connecting the DC neutral point to the negative side of the DC link of the AC/DC conversion unit 10, the potential at the DC neutral point is stabilized, so that occurrence of the common-mode current can be suppressed.

In addition, a loop for returning to the DC link from the output side of the DC/DC conversion unit 20 is formed through wiring passing through the DC filter capacitors 43, 44 from the output side of the DC/DC conversion unit 20 and then connecting the DC neutral point and the negative side of the DC link of the DC/DC conversion unit 20. Thus, an effect of suppressing leakage of the common-mode current at the DC neutral point to outside of the power conversion device can be obtained.

Further, by grounding the connection point between the resistors 45, 46, the reference potential on the DC output side is settled and thus stability of the DC neutral point voltage increases.

The power conversion device 4 of embodiment 4 is configured such that, on the basis of the power conversion device 3 of embodiment 3, the connection point between the resistors 45, 46 is grounded and the connection point between the DC filter capacitors 43, 44 is connected to the negative side of the DC link. However, the power conversion device 4 of embodiment 4 may be configured such that, on the basis of the power conversion device 2 of embodiment 2, the connection point between the resistors 45, 46 is grounded and the connection point between the DC filter capacitors 43, 44 is connected to the negative side of the DC link, whereby the same effects can be provided.

As described above, in the power conversion device of embodiment 4, a voltage division point between resistors connected to the output of the AC/DC conversion unit is grounded, and a connection point between capacitors of filters connected to the output of the DC/DC conversion unit is connected to the DC output side of the AC/DC conversion unit.

Thus, the power conversion device of embodiment 4 makes it possible to decrease the number of power conversion units, reduce the size of the device, and reduce loss. Further, in the power conversion device of embodiment 4, the potential at the AC neutral point and the potential at the DC neutral point are stabilized, so that occurrence of common-mode current can be suppressed.

Embodiment 5

In a power conversion device of embodiment 5, a third-order harmonic is superimposed on an AC voltage command value for each phase of the AC/DC conversion unit, and with respect to a DC output command value for the DC/DC conversion unit, a signal obtained by reversing the phase of the third-order harmonic is added to a DC neutral point voltage command value so as to cancel out AC neutral point voltage.

The power conversion device of embodiment 5 will be described, focusing on difference from embodiment 4, with reference to FIG. 9 and FIG. 10 that are internal configuration diagrams of the control unit. The configuration of the power conversion device of embodiment 5 is the same as the power conversion device 4 of embodiment 4, and therefore FIG. 8 that is the configuration diagram of the power conversion device 4 of embodiment 4 will be referred to, as necessary.

Operation of the power conversion device of embodiment 5 will be described.

It has been described that the relationship between the AC voltage and the DC link voltage in the AC/DC conversion unit 10 is represented by Expression (1).

In Expression (1), it is found that, even at α=1, the DC voltage needs to be as great as 2/√3=approximately 1.15 times the peak value of AC voltage. That is, in order to output AC voltage, DC voltage greater by approximately 15% than the peak voltage of the AC voltage is needed. This means that the DC voltage is not fully utilized.

Increase in the DC voltage causes a problem that switching loss of the semiconductor switching element increases and the insulation distance increases. Accordingly, the DC voltage needs to be reduced to be close to the peak value of the AC voltage, so as to fully utilize the DC voltage. Therefore, in general, on the command value for each phase AC voltage, a third-order harmonic having the same phase is superimposed. By superimposing the third-order harmonic, the lower limit value on the DC side of the AC/DC conversion unit 10 is reduced, whereby the above problem can be solved and the output voltage range of DC output directly outputted from the AC/DC conversion unit 10 can be expanded.

However, if the third-order harmonic having the same phase is superimposed on each phase AC voltage, when the respective phase voltages are summed, a third-order harmonic component remains, that is, third-order harmonic voltage occurs at the AC-side neutral point.

If connection on the AC input side of the AC/DC conversion unit 10, that is, the secondary-side winding of the power reception transformer 91 is Δ connection and connection of the AC filter capacitors 60 is Δ connection, an AC neutral point does not arise on the circuit and therefore there is no problem. On the other hand, if connection on the secondary-side winding of the power reception transformer 91 is star connection or connection of the AC filter capacitors 60 is star connection, an AC neutral point arises on the circuit.

Then, as shown in FIG. 8 in embodiment 4, if the AC neutral point and the negative side of the DC link of the AC/DC conversion unit 10 are connected to each other, large current due to the AC neutral point voltage flows through this route. Therefore, normally, if there is star connection on the AC side of the AC/DC conversion unit 10, superimposition of a third-order harmonic cannot be used.

Embodiment 5 provides means for enabling superimposition of a third-order harmonic even in a case where there is star connection on the AC side of the AC/DC conversion unit 10.

As shown in the configuration diagram in FIG. 8, the AC neutral point of the AC/DC conversion unit 10 is connected to the DC neutral point of the DC/DC conversion unit 20. Accordingly, in the DC/DC conversion unit 20, if DC neutral point voltage having a reverse phase of the AC neutral point voltage is generated, voltage on the wiring connecting the AC neutral point voltage and the DC neutral point voltage becomes 0, and thus the problem that large current flows through this wiring can be solved.

Figure 9:
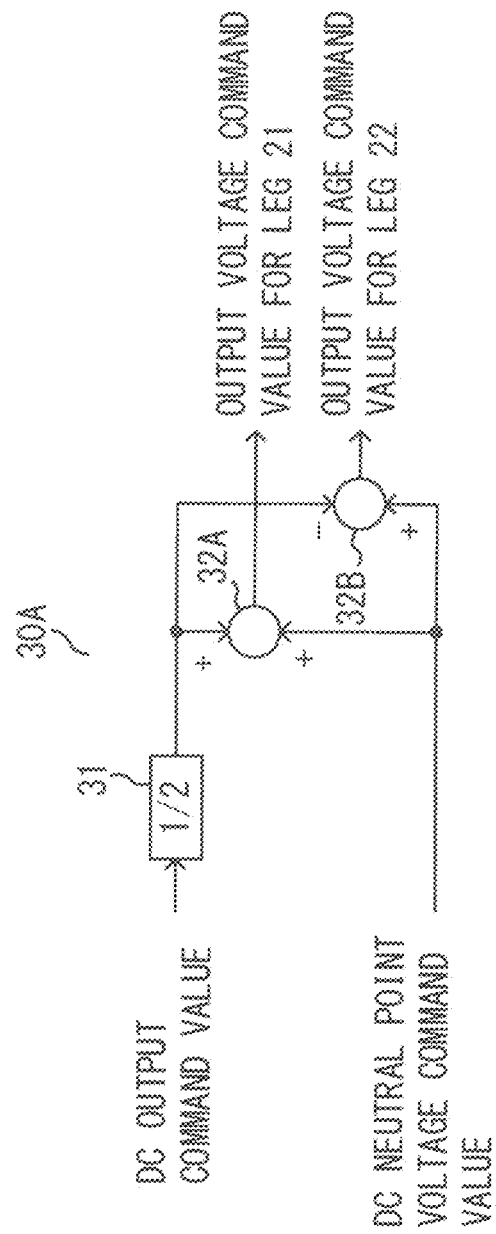
FIG. 9 is an internal configuration diagram of a control unit in a power conversion device according to embodiment 5.

FIG. 9 shows the outline of DC voltage control for the DC/DC conversion unit 20 by the control unit 30.

A voltage command value given to the leg 21 of the DC/DC conversion unit 20 is defined as VA*, a voltage command value given to the leg 22 is defined as VB*, a DC output command value is defined as Vdc*, and a DC neutral point voltage command value is defined as Vdc0*.

Here, the DC output command value Vdc* is DC voltage to be outputted from the DC/DC conversion unit 20, and therefore is basically made to coincide with the required voltage (Vdc2 requirement) of the second load 82 described in embodiment 1.

The difference between voltage outputted from the leg 21 and voltage outputted from the leg 22 is equal to the DC output voltage. Therefore, the relationship of the above command values can be represented by Expression (2).

$$VA^* - VB^* = Vdc^* \tag{2}$$

On the other hand, ½ of the sum of voltage outputted from the leg 21 and voltage outputted from the leg 22 is equal to the DC neutral point voltage. Therefore, the relationship of the above command values can be represented by Expression (3).

$$\tfrac{1}{2}(VA^* + VB^*) = Vdc0^* \tag{3}$$

Therefore, from Expressions (2) and (3), the voltage command values given to the respective legs 21, 31 can be represented by Expressions (4) and (5).

$$VA^* = (\tfrac{1}{2})Vdc^* + Vdc0^* \tag{4}$$

$$VB^* = (-\tfrac{1}{2})Vdc^* + Vdc0^* \tag{5}$$

FIG. 9 is an internal configuration diagram of the control unit 30, and shows leg output voltage command value generation means 30A for the respective legs corresponding to Expressions (4) and (5).

The leg output voltage command value generation means 30A includes a multiplier 31, an adder 32A, and a subtractor 32B.

Here, in the control unit 30, Vdc0* is calculated so as to cancel out the AC neutral point voltage.

For example, a third-order harmonic component to be superimposed on the AC neutral point voltage is generated through calculation in the control unit 30, and therefore a feedforward-like method in which a signal obtained by reversing the phase of the third-order harmonic component to be superimposed is generated and used as the neutral point voltage command value may be used.

Figure 10:
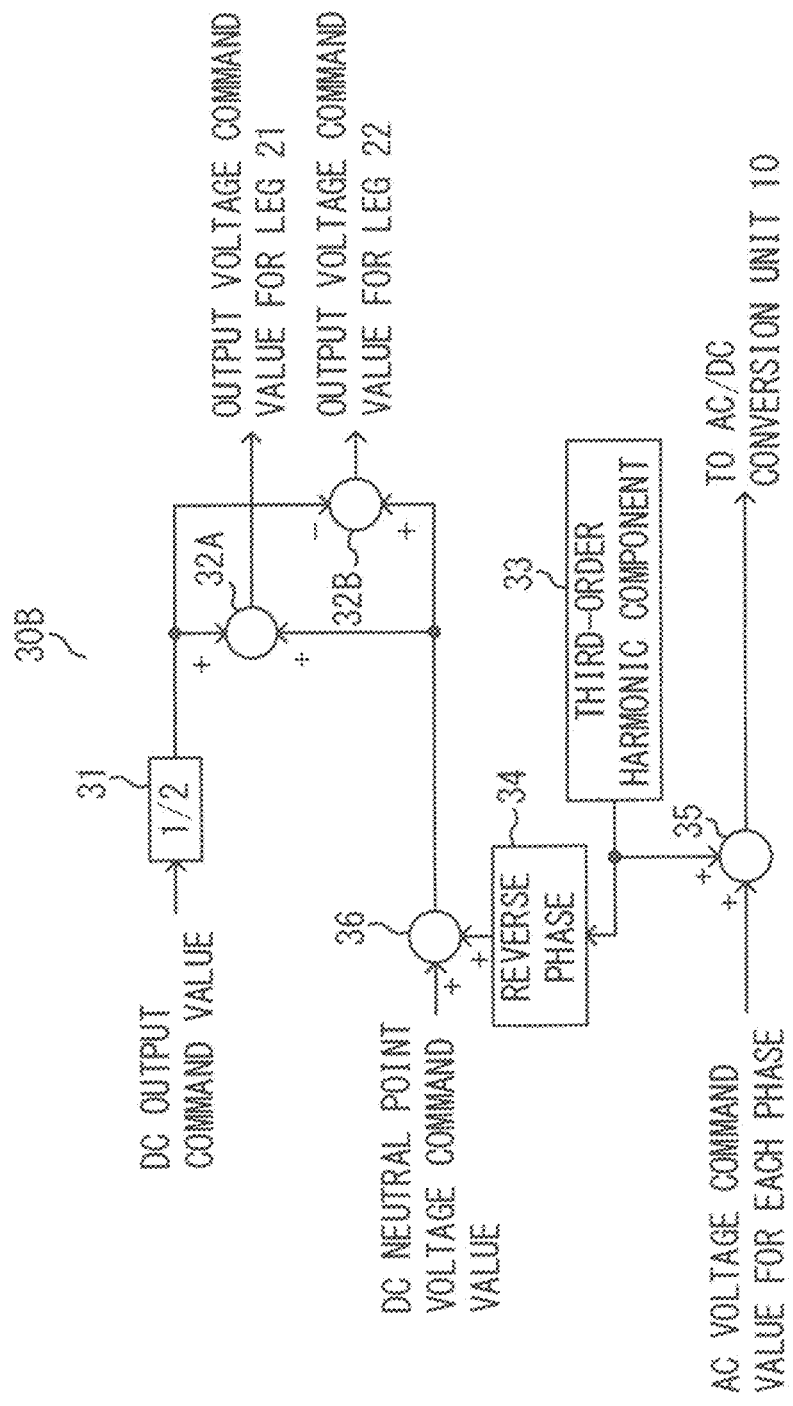
FIG. 10 is an internal configuration diagram of the control unit in the power conversion device according to embodiment 5.

FIG. 10 is an internal configuration diagram of the control unit 30, and shows the configuration of third-order harmonic processing means 30B in which the third-order harmonic component generated in the control unit 30 is superimposed on the voltage command value for each phase of AC and a signal obtained by reversing the phase of the third-order harmonic component is added to the DC neutral point voltage command value.

The third-order harmonic processing means 30B further includes a third-order harmonic generator 33, a reverse phase calculator 34, and adders 35, 36, as compared to the leg output voltage command value generation means 30A.

The voltage command value for each phase of AC on which the third-order harmonic component has been superimposed is outputted to the AC/DC conversion unit 10.

Normally, the leg output voltage command value generation means 30A and the third-order harmonic processing means 30B shown in FIG. 9 and FIG. 10 are implemented as software by a processor in the controller 30. However, they may be all or partially implemented as hardware.

Alternatively, a feedback-like method in which the DC neutral point voltage is measured and each leg voltage is controlled so that the DC neutral point voltage becomes 0, may be used.

As described above, in the power conversion device of embodiment 5, a third-order harmonic is superimposed on an AC voltage command value for the AC/DC conversion unit, and meanwhile, DC neutral point voltage of the DC/DC conversion unit is outputted so as to cancel out AC neutral point voltage.

Thus, the power conversion device of embodiment 5 makes it possible to decrease the number of power conversion units, reduce the size of the device, and reduce loss. Further, in the power conversion device of embodiment 5, even if there is star connection on the AC side of the AC/DC conversion unit 10, the output voltage range of the AC/DC conversion unit can be expanded and the DC link voltage can be effectively utilized, so that loss can be reduced.

Figure 11:
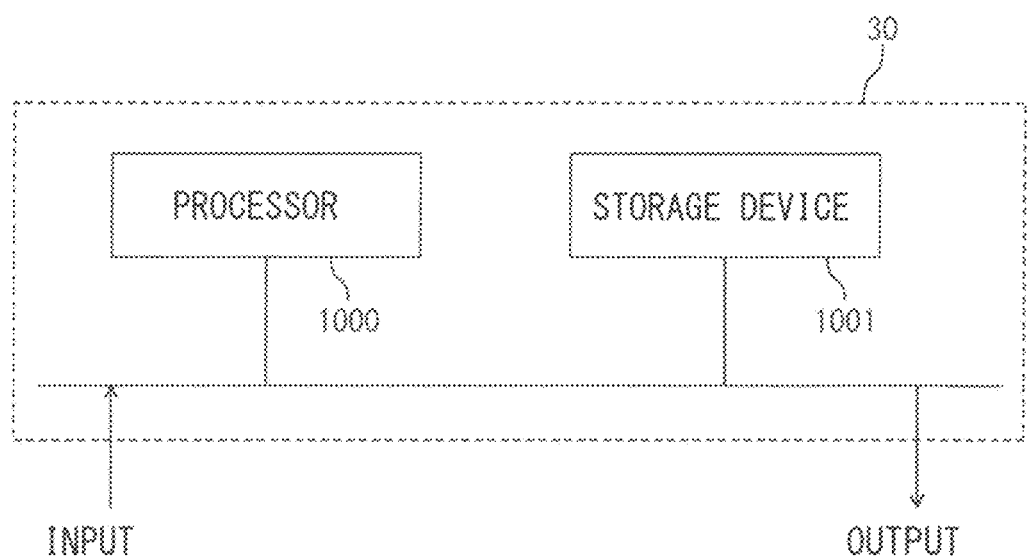
FIG. 11 is a block diagram of a hardware configuration example of a control unit, of the power conversion device.

Here, one example of hardware of the control unit 30 in the power conversion device is shown in FIG. 11. As shown in FIG. 11, the control unit 30 is composed of a processor 1000 and a storage device 1001. The storage device includes, although not shown, a volatile storage device such as a random access memory, and a non-volatile auxiliary storage device such as a flash memory.

Alternatively, the storage device may include an auxiliary storage device of a hard disk instead of a flash memory. The processor 1000 executes a program inputted from the storage device 1001. In this case, the program is inputted from the auxiliary storage device through the volatile storage device to the processor 1000. Further, the processor 1000 may output data such as a calculation result to the volatile storage device of the storage device 1001 or may save the data through the volatile storage device into the auxiliary storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1, 2, 3, 4 power conversion device
10, 10A, 10B AC/DC conversion unit
20 DC/DC conversion unit
21, 22 chopper leg
30 control unit
41, 42 DC filter reactor
43, 44 DC filter capacitor
45, 46 resistor
50 AC filter reactor
60 AC filter capacitor
81 first load
82 second load
90 AC power supply
91 power reception transformer
30A leg output voltage command value generation means
30B third-order harmonic processing means
31 multiplier
32A, 35, 36 adder
32B subtractor
33 third-order harmonic generator
34 reverse phase calculator
S1 to S4 semiconductor switching element
S5 to S10 semiconductor switching element
S11 to S14 semiconductor switching element
1000 processor
1001 storage device

The invention claimed is:

1. A power conversion device comprising:
   an AC/DC conversion circuitry; and
   at least one DC/DC conversion circuitry connected in parallel to a DC output of the AC/DC conversion circuitry,
   wherein:
   at least one of two or more DC outputs is the DC output of the AC/DC conversion circuitry,
   the DC/DC conversion circuitry includes two chopper legs connected in parallel, the chopper legs each being formed by connecting a plurality of semiconductor switching elements in series,
   voltage of the DC output of the AC/DC conversion circuitry is divided by resistors,
   DC filters each including a DC filter reactor and a DC filter capacitor are connected to respective outputs of the chopper legs of the DC/DC conversion circuitry,
   one end and one end of the respective DC filter capacitors are connected to each other. and
   a voltage division point between the resistors and a connection point between the DC filter capacitors are connected to each other.

2. The power conversion device according to claim 1, wherein:
   AC filters each including an AC filter reactor and an AC filter capacitor are connected to an AC side of the AC/DC conversion circuitry,
   the AC filter capacitors are connected in Y connection, and
   a neutral point among the AC filter capacitors is connected to the DC output side of the AC/DC conversion circuitry.

3. The power conversion device according to claim 2, wherein:
   the voltage division point between the resistors is grounded, and
   the connection point between the DC filter capacitors is connected to the DC output side of the AC/DC conversion circuitry.

4. The power conversion device according to claim 3, further comprising:
   control circuitry for controlling the AC/DC conversion circuitry and the DC/DC conversion circuitry, wherein the control circuitry superimposes a third-order harmonic on an AC voltage command value for each phase of the AC/DC conversion circuitry, and controls DC neutral point voltage of the DC/DC conversion circuitry so as to cancel out AC neutral point voltage.

5. The power conversion device according to claim 4, wherein:
the control circuitry controls output voltage of the AC/DC conversion circuitry so as to follow required voltage of a first load connected to the AC/DC conversion circuitry, and controls output voltage of the DC/DC conversion circuitry so as to follow required voltage of a second load connected to the DC/DC conversion circuitry.

6. The power conversion device according to claim 1, wherein:
AC filters each including an AC filter reactor and an AC filter capacitor are connected to an AC side of the AC/DC conversion circuitry,
the AC filter capacitors are connected in Y connection, and
a neutral point among the AC filter capacitors is connected to the DC output side of the AC/DC conversion circuitry.

7. The power conversion device according to claim 1, further comprising:
control circuitry for controlling the AC/DC conversion circuitry and the DC/DC conversion circuitry,
wherein the control circuitry controls DC output voltage of the AC/DC conversion circuitry so as to follow required voltage of a first load connected to the AC/DC conversion circuitry, and controls output voltage of the DC/DC conversion circuitry so as to follow required voltage of a second load connected to the DC/DC conversion circuitry.

8. The power conversion device according to claim 2, further comprising:
control circuitry for controlling the AC/DC conversion circuitry and the DC/DC conversion circuitry,
wherein the control circuitry controls DC output voltage of the AC/DC conversion circuitry so as to follow required voltage of a first load connected to the AC/DC conversion circuitry, and controls output voltage of the DC/DC conversion circuitry so as to follow required voltage of a second load connected to the DC/DC conversion circuitry.

9. The power conversion device according to claim 3, further comprising:
control circuitry for controlling the AC/DC conversion circuitry and the DC/DC conversion circuitry,
wherein the control circuitry controls DC output voltage of the AC/DC conversion circuitry so as to follow required voltage of a first load connected to the AC/DC conversion circuitry, and controls output voltage of the DC/DC conversion circuitry so as to follow required voltage of a second load connected to the DC/DC conversion circuitry.

10. The power conversion device according to claim 5, wherein:
the DC/DC conversion circuitry is a step-down circuit,
if the required voltage of the second load connected to an output of the step-down circuit is smaller than a lower limit value of the DC output voltage of the AC/DC conversion circuitry determined from AC voltage of the AC/DC conversion circuitry, the control circuitry controls the AC/DC conversion circuitry so as to output DC voltage equal to or greater than the lower limit value, and controls the DC/DC conversion circuitry so as to convert the DC output voltage of the AC/DC conversion circuitry to the required voltage, and
if the required voltage of the second load is equal to or greater than the lower limit value, the control circuitry controls the AC/DC conversion circuitry so as to output DC voltage equal to or greater than the required voltage, and controls the DC/DC conversion circuitry so as to convert the DC output voltage of the AC/DC conversion circuitry to the required voltage.

11. The power conversion device according to claim 6, further comprising:
control circuitry for controlling the AC/DC conversion circuitry and the DC/DC conversion circuitry, wherein
the control circuitry controls DC output voltage of the AC/DC conversion circuitry so as to follow required voltage of a first load connected to the AC/DC conversion circuitry, and controls output voltage of the DC/DC conversion circuitry so as to follow required voltage of a second load connected to the DC/DC conversion circuitry.

12. The power conversion device according to claim 7, wherein:
the DC/DC conversion circuitry is a step-down circuit,
if the required voltage of the second load connected to an output of the step-down circuit is smaller than a lower limit value of the DC output voltage of the AC/DC conversion circuitry determined from AC voltage of the AC/DC conversion circuitry, the control circuitry controls the AC/DC conversion circuitry so as to output DC voltage equal to or greater than the lower limit value, and controls the DC/DC conversion circuitry so as to convert the DC output voltage of the AC/DC conversion circuitry to the required voltage, and
if the required voltage of the second load is equal to or greater than the lower limit value, the control circuitry controls the AC/DC conversion circuitry so as to output DC voltage equal to or greater than the required voltage, and controls the DC/DC conversion circuitry so as to convert the DC output voltage of the AC/DC conversion circuitry to the required voltage.

13. The power conversion device according to claim 8, wherein:
the DC/DC conversion circuitry is a step-down circuit,
if the required voltage of the second load connected to an output of the step-down circuit is smaller than a lower limit value of the DC output voltage of the AC/DC conversion circuitry determined from AC voltage of the AC/DC conversion circuitry, the control circuitry controls the AC/DC conversion circuitry so as to output DC voltage equal to or greater than the lower limit value, and controls the DC/DC conversion circuitry so as to convert the DC output voltage of the AC/DC conversion circuitry to the required voltage, and
if the required voltage of the second load is equal to or greater than the lower limit value, the control circuitry controls the AC/DC conversion circuitry so as to output DC voltage equal to or greater than the required voltage, and controls the DC/DC conversion circuitry so as to convert the DC output voltage of the AC/DC conversion circuitry to the required voltage.

14. The power conversion device according to claim 9, wherein:
the DC/DC conversion circuitry is a step-down circuit,
if the required voltage of the second load connected to an output of the step-down circuit is smaller than a lower limit value of the DC output voltage of the AC/DC conversion circuitry determined from AC voltage of the AC/DC conversion circuitry, the control circuitry controls the AC/DC conversion circuitry so as to output DC voltage equal to or greater than the lower limit value, and controls the DC/DC conversion circuitry so as to convert the DC output voltage of the AC/DC conversion circuitry to the required voltage, and if the required voltage of the second load is equal to or greater than the lower limit value, the control circuitry controls the AC/DC conversion circuitry so as to output DC voltage equal to or greater than the required voltage, and controls the DC/DC conversion circuitry so as to convert the DC output voltage of the AC/DC conversion circuitry to the required voltage.

15. A power conversion device comprising:
an AC/DC conversion circuitry: and
at least one DC/DC conversion circuitry connected in parallel to a DC output of the AC/DC conversion circuitry,
wherein:
at least one of two or more DC outputs is the DC output of the AC/DC conversion circuitry,
the DC/DC conversion circuitry includes two chopper legs connected in parallel, the chopper legs each being formed by connecting a plurality of semiconductor switching elements in series,
AC filters each including an AC filter reactor and an AC filter capacitor are connected to an AC side of the AC/DC conversion circuitry,
the AC filter capacitors are connected in Y connection, and
a neutral point among the AC filter capacitors is connected to the DC output side of the AC/DC conversion circuitry.

16. The power conversion device according to claim 15, further comprising:
control circuitry for controlling the AC/DC conversion circuitry and the DC/DC conversion circuitry,
wherein the control circuitry controls DC output voltage of the AC/DC conversion circuitry so as to follow required voltage of a first load connected to the AC/DC conversion circuitry, and controls output voltage of the DC/DC conversion circuitry so as to follow required voltage of a second load connected to the DC/DC conversion circuitry.

17. The power conversion device according to claim 16, wherein:
the DC/DC conversion circuitry is a step-down circuit,
if the required voltage of the second load connected to an output of the step-down circuit is smaller than a lower limit value of the DC output voltage of the AC/DC conversion circuitry determined from AC voltage of the AC/DC conversion circuitry, the control circuitry controls the AC/DC conversion circuitry so as to output DC voltage equal to or greater than the lower limit value, and controls the DC/DC conversion circuitry so as to convert the DC output voltage of the AC/DC conversion circuitry to the required voltage, and if the required voltage of the second load is equal to or greater than the lower limit value, the control circuitry controls the AC/DC conversion circuitry so as to output DC voltage equal to or greater than the required voltage, and controls the DC/DC conversion circuitry so as to convert the DC output voltage of the AC/DC conversion circuitry to the required voltage.

18. A power conversion device comprising:
an AC/DC conversion circuitry; and
at least one DC/DC conversion circuitry connected in parallel to a DC output of the AC/DC conversion circuitry, wherein
at least one of two or more DC outputs is the DC output of the AC/DC conversion circuitry, and
the DC/DC conversion circuitry includes two chopper legs connected in parallel, the chopper legs each being formed by connecting a plurality of semiconductor switching elements in series,
further comprising:
control circuitry for controlling the AC/DC conversion circuitry and the DC/DC conversion circuitry,
wherein:
the control circuitry controls DC output voltage of the AC/DC conversion circuitry so as to follow required voltage of a first load connected to the AC/DC conversion circuitry, and controls output voltage of the DC/DC conversion circuitry so as to follow required voltage of a second load connected to the DC/DC conversion circuitry,
the DC/DC conversion circuitry is a step-down circuit,
if the required voltage of the second load connected to an output of the step-down circuit is smaller than a lower limit value of the DC output voltage of the AC/DC conversion circuitry determined from AC voltage of the AC/DC conversion circuitry, the control circuitry controls the AC/DC conversion circuitry so as to output DC voltage equal to or greater than the lower limit value, and controls the DC/DC conversion circuitry so as to convert the DC output voltage of the AC/DC conversion circuitry to the required voltage, and if the required voltage of the second load is equal to or greater than the lower limit value, the control circuitry controls the AC/DC conversion circuitry so as to output DC voltage equal to or greater than the required voltage, and controls the DC/DC conversion circuitry so as to convert the DC output voltage of the AC/DC conversion circuitry to the required voltage.

* * * * *